(12) United States Patent
Brahmi et al.

(10) Patent No.: US 9,907,081 B2
(45) Date of Patent: Feb. 27, 2018

(54) MANAGING RESOURCES FOR DEVICE-TO-DEVICE D2D DISCOVERY IN AN AD-HOC RADIO COMMUNICATION NETWORK

(71) Applicant: Telefonaktiebolaget L M Ericsson (publ), Stockholm (SE)

(72) Inventors: Nadia Brahmi, Aachen (DE); Gabor Fodor, Hässelby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 56 days.

(21) Appl. No.: 14/898,585

(22) PCT Filed: Jun. 27, 2013

(86) PCT No.: PCT/SE2013/050799
§ 371 (c)(1),
(2) Date: Dec. 15, 2015

(87) PCT Pub. No.: WO2014/209182
PCT Pub. Date: Dec. 31, 2014

(65) Prior Publication Data
US 2016/0135200 A1 May 12, 2016

(51) Int. Cl.
*H04W 72/08* (2009.01)
*H04W 88/00* (2009.01)
(Continued)

(52) U.S. Cl.
CPC .......... *H04W 72/085* (2013.01); *H04W 4/06* (2013.01); *H04W 8/005* (2013.01);
(Continued)

(58) Field of Classification Search
CPC ..... H04W 84/18; H04W 84/20; H04W 84/22; H04W 20/021
See application file for complete search history.

(56) References Cited

U.S. PATENT DOCUMENTS

2008/0233977 A1* 9/2008 Xu .................. H04W 8/205
455/461
2010/0317291 A1* 12/2010 Richardson ....... H04W 74/0825
455/63.1
(Continued)

FOREIGN PATENT DOCUMENTS

WO 2010144826 A1 12/2010
WO 2013191609 A1 12/2013

OTHER PUBLICATIONS

S. Ganu, S. Zhao, L. Raju, B. Anepu, I. Seskar and D. Raychaudhuri, Architecture and Prototyping of an 802.11 Based Self-Organizing Hierarchical Ad-hoc Wireless Network (SOHAN), 15th IEEE International Symposium on Personal, Indoor and Mobile Radio Communications, Sep. 8, 2004, pp. 1-5.*
(Continued)

*Primary Examiner* — Christopher Crutchfield
(74) *Attorney, Agent, or Firm* — Coats & Bennett, PLLC

(57) ABSTRACT

A method and a radio node (110) for managing resources for Device-to-Device discovery in an ad-hoc radio communication network are disclosed. The radio node (110) measures, on an amount of resources, received power to obtain values of received power. The values of received power include a respective value of received power for each resource of the amount of resources. The received power includes power of any existing beacon signals received from one or more of the further radio nodes (120, 130, 140). The radio node (110) selects at least one resource out of the amount of resources. The respective value of received power for the selected at least one resource is among the least of the obtained respective values of received power. The radio node (110) broadcasts, to the further radio nodes (120, 130, 140), a beacon signal on the selected at least one resource, wherein the beacon signal includes one or more of the values of received power.

15 Claims, 4 Drawing Sheets

(51) Int. Cl.
  *H04W 4/06* (2009.01)
  *H04W 72/04* (2009.01)
  *H04W 76/02* (2009.01)
  *H04W 84/18* (2009.01)
  *H04W 8/00* (2009.01)

(52) U.S. Cl.
  CPC ....... *H04W 72/046* (2013.01); *H04W 76/023* (2013.01); *H04W 84/18* (2013.01)

(56) References Cited

U.S. PATENT DOCUMENTS

| | | | | |
|---|---|---|---|---|
| 2012/0265818 | A1* | 10/2012 | Van Phan | H04W 4/06 709/204 |
| 2014/0133593 | A1* | 5/2014 | Lim | H04L 25/0328 375/265 |
| 2014/0321377 | A1* | 10/2014 | Ryu | H04W 72/1247 370/329 |

OTHER PUBLICATIONS

Ni, J., et al., "Coloring Spatial Point Processes with Applications to Peer Discovery in Large Wireless Networks", IEEE/ACM Transactions on Networking, Apr. 1, 2011, pp. 575-588, vol. 19, No. 2, IEEE.

Baccelli, F., et al., "On the Design of Device-to-Device Autonomous Discovery", 2012 Fourth International Conference on Communication Systems and Networks (COMSNETS), Jan. 3, 2012, pp. 1-9, IEEE.

Li, Z., "Performance Analysis of Network Assisted Neighbor Discovery Algorithms", Degree project in Automatic Control, Second Level, Aug. 16, 2012, pp. 1-64, School of Electrical Engineering.

* cited by examiner

MANAGING RESOURCES FOR DEVICE-TO-DEVICE D2D DISCOVERY IN AN AD-HOC RADIO COMMUNICATION NETWORK

TECHNICAL FIELD

Embodiments herein relate to wireless communication systems, such as telecommunication systems. A method and a radio node for managing resources for Device-to-Device discovery in an ad-hoc radio communication network are disclosed.

BACKGROUND

Within the field of telecommunication systems, technologies for creating so called ad-hoc networks have been developed in order to for example simplify network deployment and provide a more dynamic network environment. An ad-hoc network comprises a set of network nodes, such as cellular phones. A network node may join or leave the ad-hoc network for various reasons, such as mobility, coverage conditions and more. In order for the network node to be able to join the ad-hoc network, a joining network node, i.e. a network node that wishes to join the ad-hoc network, is required to be able to discover the ad-hoc network. This means that the ad-hoc network comprises the network nodes that have already joined the ad-hoc network. Moreover, the joining node is required to be able to be discovered by the nodes in the ad-hoc network. This is generally referred to as discovery, and in particular to Device-to-Device (D2D) discovery.

Hence, in ad-hoc networking, D2D discovery refers to a procedure that allows devices in the proximity of each other to detect the presence of one another. Sometimes, D2D discovery may be referred to as neighbor or peer discovery. D2D discovery in ad hoc networks involves an engineering tradeoff between energy efficiency, discovery range, the number of discovered devices and the discovery time. Typically, ad hoc technologies such as Bluetooth deal with this problem by carefully designing measurement and beacon signaling procedures and employing state transitions between energy conserving and active states, e.g. between a beacon detecting state and a beacon transmitting state.

D2D discovery is a well-known and widely used component of many existing wireless technologies, including ad hoc and cellular networks. Apart from Bluetooth, several variants of the IEEE 802.11 standards suite, such as WiFi Direct include technical solutions for device discovery. A key technique used by these standards is to use specially designed so called beacon signals that devices can broadcast and capture, so that nearby devices are able to detect the proximity as well as some characteristics of such beacon broadcasting devices.

Beacon signaling based neighbor device discovery requires that a broadcasting device and a receiving device meet in the time, frequency and code domains. Furthermore, in order for discovery to work, the beacon receiving device is required to be able to decode the information encoded in the beacon signal. In other words, the beacon signal must reach a certain Signal-to-Noise-and-Interference Ratio (SINR) threshold at the receiving device in order for the beacon signal to be detected at the receiving device.

Although D2D discovery for ad hoc networks, using technologies such as Bluetooth, WiFi Direct, has been known for some time, only few techniques have been proposed and built for devices operating in cellular spectrum and using cellular technologies with or without the need for a base station. Hence, in the context of D2D discovery techniques for devices operating in cellular spectrum and using cellular technologies a few shortcomings have been identified.

A first known technique uses random selection of Peer Discovery Resources (PDR), which is a set of resources selected from within the cellular spectrum. The PDRs are dedicated for beacon signaling. With this technique, each beacon broadcasting device randomly selects one PDR, or as many as required for the beacon signal to be broadcast, out of dedicated PDRs within the cellular time-frequency resources. This technique may lead to situations in which multiple devices in the vicinity of each other use colliding PDRs. Such collisions of beacon signals make beacon signals undetectable or not decodable by receiving devices. Thus, D2D discovery by means of the beacon signals becomes difficult or even impossible.

A second known technique uses so called greedy, or opportunistic, selection of PDRs. This means that a device selects a PDR that is not used. When the number of nodes in the ad-hoc network exceeds the number of available discovery resources, all PDRs are being used at a given point in time. In this case, when a new node joins the ad-hoc network, or a device population, the new node selects one PDR for which a distance to the closest peer, or neighbor device, currently using that resource is maximized. This may be expressed by:

$$C(i) = \underset{k}{\mathrm{argmax}}(\underset{j \in N_k}{\min}(\|X_i - X_j\|)),$$

where $C(i)$ denotes the selected resource for node-i, and $\|X_i - X_j\|$ denotes the Euclidean distance between node-i and node-j. $N_k$ is the set of the nodes that are assigned to the resource k when node i joined the network. Selecting the resource according to the above formula corresponds to so called greedily picking a resource, sometimes referred to as channel, that produces the best Euclidean separation between the node selecting the peer discovery resource and other peers using the same peer discovery resource. A first noteworthy characteristic of this distance based peer discovery resource selection algorithm is that it requires the capability of performing measurements per peer discovery resource and per neighbor node. A second noteworthy characteristic of the distance based selection objective above is that it involves minimizing the distance to a particular peer. In certain scenarios, alternative techniques of separating PDRs selected by different nodes may be required.

SUMMARY

An object is to improve D2D discovery in an ad-hoc network of the above mentioned kind.

According to an aspect, the object is achieved by a method in a radio node for managing resources for D2D discovery in an ad-hoc radio communication network. The ad-hoc radio communication network comprises a number of further radio nodes. The resources comprise an amount of resources that are dedicated for transmission of beacon signals for D2D discovery. The radio node measures, on the amount of resources, received power to obtain values of received power. The values of received power include a respective value of received power for each resource of the amount of resources. The received power includes power of any existing beacon signals received from one or more of the further radio nodes. Then, the radio node selects at least one resource out of the amount of resources. The respective value of received power for the selected at least one resource is among the least of the obtained respective values of received power. Moreover, the radio node broadcasts, to the further radio nodes, a beacon signal on the selected at least one resource, wherein the beacon signal includes one or more of the values of received power.

According to another aspect, the object is achieved by a radio node configured to manage resources for D2D discovery in an ad-hoc radio communication network. The ad-hoc radio communication network comprises a number of further radio nodes. The resources comprise an amount of resources that are dedicated for transmission of beacon signals for DD discovery. The amount of resources may be less than or equal to the number of further radio nodes. The radio node comprises a processing circuit configured to measure, on the amount of resources, received power to obtain values of received power. The values of received power include a respective value of received power for each resource of the amount of resources. The received power includes power of any existing beacon signals received from one or more of the further radio nodes. Furthermore, the processing circuit is configured to select at least one resource out of the amount of resources. The respective value of received power for the selected at least one resource is among the least of the obtained respective values of received power. Moreover, the processing circuit is configured to broadcast, to the further radio nodes, a beacon signal on the selected at least one resource. The beacon signal includes one or more of the values of received power.

Thanks to that the radio node measures received power to obtain values of received power, the radio node is able to select the resource for which the obtained respective value of received power is among the least. This means that the radio node merely has to measure, or detect, received power at each resource of the amount of resources; no consideration of from which neighboring radio node the measured power has been transmitted has to be taken. Therefore, for example, D2D discovery is improved in terms of scalability of the D2D discovery technique, i.e. how well the D2D discovery technique performs as the number of radio nodes increase. As a result, the above mentioned object is achieved.

An advantage is that a requirement of per-node measurements as in the known technique described above is relaxed. At the same time, embodiments herein enable selection of a resource for which a common interference, i.e. common for radio nodes using a particular resource, is small, or even minimized.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
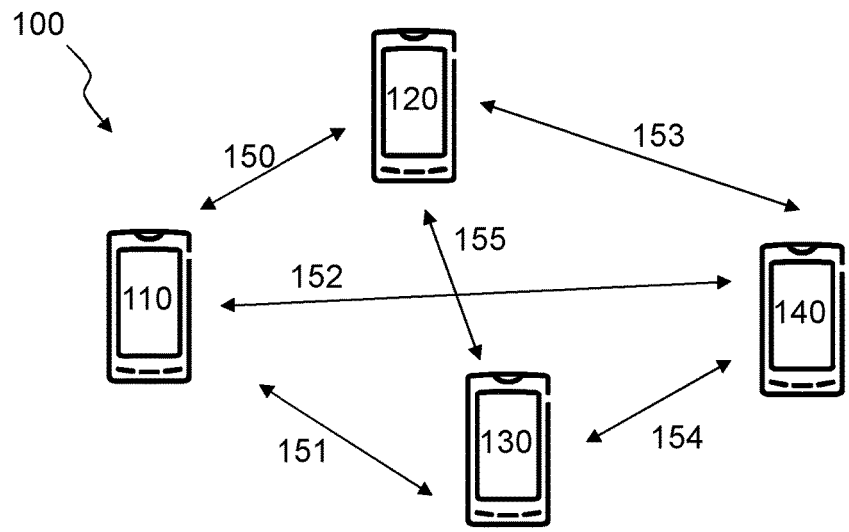
FIG. 1 is a schematic overview of an exemplifying ad-hoc radio communication network in which embodiments herein may be implemented.

Throughout the following description similar reference numerals have been used to denote similar elements, nodes, units, modules, parts, items or features, when applicable. In the Figures, features that appear in some embodiments are indicated by dashed lines.

FIG. 1 depicts an exemplifying ad-hoc radio communication network 100 in which embodiments herein may be implemented. In this example, the radio communication network 100 is a Long Term Evolution (LTE) system. In other examples, the radio communication network may be any Third Generation Partnership Project (3GPP) cellular communication system, such as a Wideband Code Division Multiple Access (WCDMA) network, a Global System for Mobile communication (GSM network), etc. or any evolutions thereof. The ad-hoc radio communication network 100 may, or may not, be within coverage of a radio network node (not shown). The radio network node may be a radio base station, an eNB, a radio network controller, a base station controller or the like.

A radio node 110 may be located in the vicinity of the ad-hoc communication network 100. As will be explained below the radio node 110 may wish to join the ad-hoc radio communication network 100.

The ad-hoc radio communication network 100 comprises a number of further radio nodes 120, 130, 140. As used herein, the term "radio node" may refer to an evolved Node B (eNB), a control node controlling one or more Remote Radio Units (RRUs), a radio base station, an access point or the like. As used herein, the term "radio node" may refer to a user equipment, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc.

In some examples, the radio node 110 may be referred to as a first radio node and each of the further radio nodes 120, 130, 140 may be referred to as a second radio node 120, a third radio node 130 and a fourth radio node 140, respectively.

As an example, the first radio node 110 may be about to join the ad-hoc radio communication network 100. Therefore, the first radio node 110 may send and receive 150, 151, 152 beacon signals, or beacons for short, in communication with the second radio node 120, the third radio node 130 and/or the fourth radio node 140.

As a further example, the second, third and fourth radio nodes 120, 130, 140 may have already joined the ad-hoc radio communication network 100. Therefore, in order to discover the first radio node 110 and to be discovered by the first radio node 110, the second, third and fourth radio nodes 120, 130, 140 may additionally send and receive 153, 154 beacons. Moreover, sending and receiving 155 of beacons between the second and third radio node 120, 130, 140 are also shown. In essence, this means that the beacon signals are transmittable between any of the radio node 110 and the further radio nodes 120, 130, 140.

The first, second, third and fourth radio nodes 110, 120, 130, 140 are assumed to be randomly located, or placed, in some geographical area within which D2D communication is deemed possible.

Each of the first, second, third and fourth radio nodes 110, 120, 130, 140 is aware of a default set of resources that are dedicated for transmission of beacon signals for D2D discovery. For example, the default set of resources may be preconfigured in each radio node 110, 120, 130, 140. Each radio node 110, 120, 130, 140 may use any PDR of the default set of resources for broadcasting of beacon signals. Such pre-configuration may be achieved by a network node, e.g. an eNB of an LTE system, a base station or the like, that allocates and broadcasts the default set of resources, aka a set of PDRs, based on the density of the UEs. Here, density of the UEs refers to how sparse or compactly the UEs are located from each other.

In certain scenarios, the default set of resources may be based on which method shall be used for selection of a particular PDR for beacon signaling. For example, the set of PDRs that may be used according to embodiments herein may for example be different from a further predefined set of PDRs that may be used when the first and/or second technique, described in the background section, is implemented. The selection of PDRs for broadcasting of a beacon signal and the contents of the beacon signal addresses the inherent tradeoff between the complexity of measurements that need to be performed by the radio node 110 selecting the PDR and reducing the interference level in the ad-hoc radio communication network 100. Furthermore, the information broadcasted in the beacon signal helps other nodes of the ad-hoc radio communication network 100 to select their PDR to broadcast their respective beacon signals.

As used herein, a resource may refer to a certain coding of a beacon signal and/or a time frame and/or a frequency range in which the beacon signal is transmitted. In some examples, a resource may refer to one or more physical resource blocks (PRB) which are used when transmitting the beacon signal. In more detail, a PRB may be in the form of orthogonal frequency division multiplexing (OFDM) PHY resource blocks (PRB). The term "physical resource block" is known from 3GPP terminology relating to e.g. Long Term Evolution Systems.

All of the first, second, third and fourth radio nodes 110, 120, 130, 140 may preferably use the same transmission power level to broadcast their respective beacon signal. The transmission power level may be set either by a network node and/or a default transmit power level may have been preconfigured in each radio node 110, 120, 130, 140.

The radio node 110, 120, 130, 140 may be globally synchronized using an external device, e.g. a WCDMA base station, an LTE eNB or a common external timing source, e.g. satellites of the Global Positioning System (GPS).

Furthermore, each radio node 110, 120, 130, 140 may be discovered if a beacon signal received from it reaches or exceeds a threshold value for discovery, which threshold value may for example specify a Signal-to-Interference-and-Noise ratio (SINR). The threshold value for discovery may depend on receiver sensitivity, employed modulation and coding scheme of the beacon signal and other factors. The threshold value for discovery may be predefined to e.g. 1 dB. A higher threshold value imply better conditions in terms of chance of correctly receiving the beacon signal, but the higher the threshold value is the shorter a so called discovery range may be. The discovery range refers to a maximum distance between any two radio nodes at which the two radio nodes still are able to discover each other.

According to the embodiments herein per-resource measurements are utilized to obtain a measure of signal power, or interference, at some set of resources. That is to say, measurements of aggregated measurable interference levels are utilized instead of measurements per-neighbor node as in the second technique mentioned in the background section The node, for which a PDR is to be selected, performs only per-resource measurements during a listening phase. During, or after, the listening phase, the node determines, or selects, the resource, e.g. one or more PDRs, that exhibits a small, or even the smallest, aggregated interference.

Figure 2:
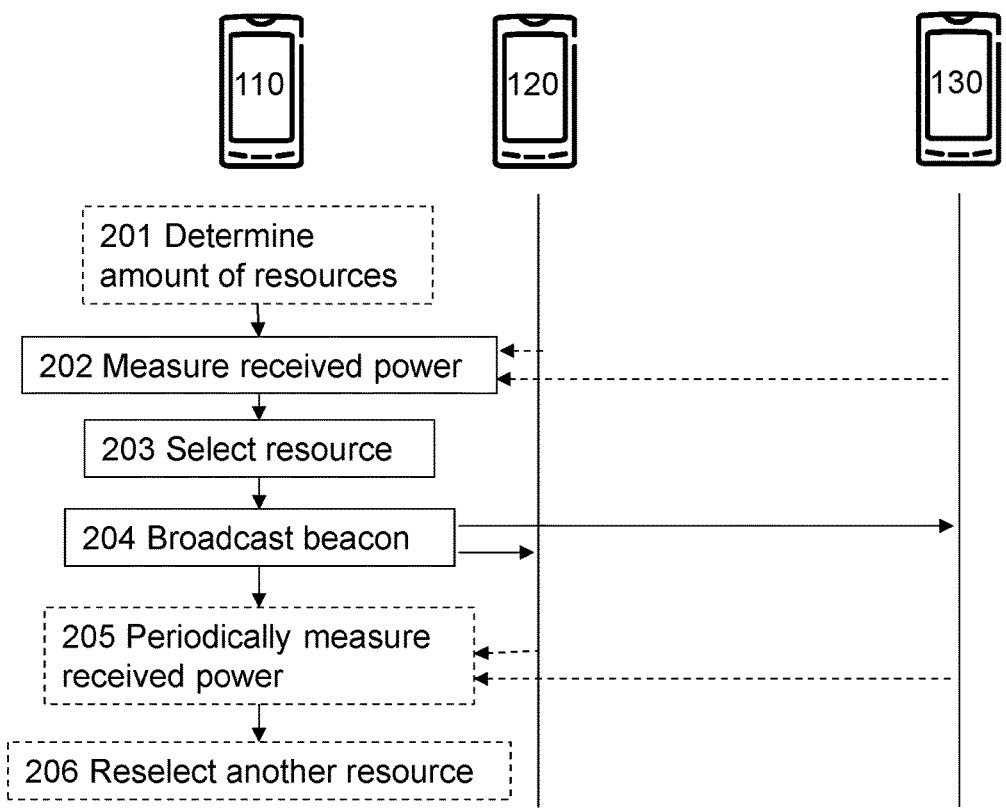
FIG. 2 is a schematic, combined signaling scheme and flowchart illustrating embodiments when implemented in the radio communication network according to FIG. 1.

FIG. 2 illustrates an exemplifying method for managing resources for D2D discovery when implemented in the radio communication system 100 of FIG. 1.

In some examples, the amount of resources may be less than or equal to the number of further radio nodes 120, 130, 140. This means that there cannot be one resource for each radio node after the radio node 110 has joined the ad-hoc communication network 100. In other examples, there may be enough resources so that one resource, or as many as required, can be allocated to only one radio node in the ad-hoc communication network. That is to say, the amount of resources may be greater than the number of further radio nodes 120, 130, 140. The method presented below may apply also to these other examples. The method below describes how to find and select the, or those, un-allocated resources with the present method.

The following actions may be performed in any suitable order.

Action 201

The radio node 110 may determine the amount of resources as a subset of a default set of resources dedicated for beacon signaling. This means that the amount of resources may include fewer resources than the default set of resources. The radio node 110 may perform measurements, during the listening phase, on the resources included in the amount of resources.

As mentioned, the amount of resources may be randomly selected from the default set of resources.

Alternatively or additionally, when the radio node occasionally measures a respective value of received power for each resource of the default set of resources, the following selection criteria for the amount of resource may be applied: the resources to be included in the amount of resource may be selected based on that the respective received power value for each resource of the amount of resources is below a threshold value for selection of the amount of resources, aka a threshold value for resource selection. Hence, in case a resource already is heavily utilized, as indicated by a respective received power value being above the threshold value for resource selection, it may not be worthwhile evaluating, e.g. periodically in action 205, that particular resource as a possible resource to use in action 204 by the radio node 110.

Limiting the amount of resources to a subset of the default set of resources has the advantage that the radio node 110 has to perform less measurements. With less measurements, the radio node 110 may more quickly select a PDR, possibly at the expense of selecting a suboptimal PDR.

Action 202

The radio node 110 measures, on the amount of resources, received power to obtain values of received power. The values of received power include a respective value of received power for each resource of the amount of resources.

The received power includes power of any existing beacon signals received from one or more of the further radio nodes 120, 130, 140. The received power may also include power of thermal noise. It shall here be noted that the radio nodes 110 measures the received powered on a per resource basis only. That is to say, no consideration of which one of the one or more further radio nodes 120, 130, 140 has transmitted the any existing beacon signals is taken. This is referred to as "listening phase" herein.

The respective value of received power may preferably be given by a Received Signal Strength Indicator (RSSI), which is known from cellular technologies, such as specified by the 3GPP. In other examples, the respective value of received power may be given indirectly by Signal to Interference & Noise Ratio (SINR), Signal to Noise Ratio (SNR), Signal to Interference Ratio (SIR), Reference Signal Received Power (RSRP), Reference Signal Received Quality (RSRQ) or the like. In these other examples, the respectively value of received power is given by adding together e.g. SIR on a respective resource for all neighboring nodes.

Preferably, any existing beacon signals are received from two or more of the further radio nodes 120, 130, 140. Hence, the measured received power, for a particular resource, is not a measurement of power received per each neighbor, such as per each one of the further radio nodes 120, 130, 140. Instead, the measured received power, for that particular resource, relates to two or more of the further radio nodes 120, 130, 140. Expressed differently, a total, or common, received power is measured.

During the listening phase, the radio node 110 determines the interference level on each PDR that is a member of the amount of resources. Alternatively, the radio node 110 may also measure the currently dominating interference level on a set of consecutive, in frequency domain, resources thereby relaxing the requirement on gathering and storing measurements on each individual resource of the amount of resources. This type of aggregate measurement can help the radio node 110 to determine a smaller subset of the PDRs out of which it can subsequently perform further measurements or simply select, e.g. randomly select, one PDR out of the subset that had low measurement results. Here, low measurement results may be in relation to the threshold value for resource selection mentioned in action 201.

Action 203

Now that the radio node 110 has calculated the respective values of received power, it may use these values to select one or more suitable resources for signaling of beacon signals. Thus, the radio node 110 selects at least one resource such as a PDR out of the amount of resources. The respective value of received power for the selected at least one resource is among the least of the obtained respective values of received power.

The respective value of received power of the selected at least one resource may be below a threshold value indicating acceptable received power. Expressed differently, the threshold value determines when the respective value may be considered to be among the least of the obtained respective values of received power. As is explained in the following example, "acceptable" may in this context be that the resource is considered to be available for transmission of beacon signals. Thus, the threshold value may indicate a level of received power, wherein the level of received power indicates a maximum level for when a resource shall, or is, considered to be available for transmission of beacon signals. The threshold value may be predefined or signaled by the radio base station (not shown in FIG. 1).

When the respective value of received power is below the threshold, the received power may be considered to be small.

Moreover, the received power may be referred to as received interference. The threshold value may be predetermined or determined based on measurements from previous listening phases. For example, the threshold may be set to an average of previous measurements or the maximum value of the preceding N measurements, where N is a predefined constant. As a further example, the average of previous measurements may be divided by M, where M>1, to set a more stringent restriction. The more stringent restriction implies a lower threshold value than if the average is used. By way of example, M can be set to M=10.

In this action, the radio node 110 autonomously chooses the resource such as PDR that has the lowest, or among the lowest, interference level under a pre-configurable time interval, such as during the listening phase or during a plurality of listening phases.

Expressed differently, action 203 may be summarized as finding the PDR k that minimizes the sum interference level at the radio node 110:

$$C(i) = \mathrm{argmin}_k (S_{i,k}),$$

where C(i) denotes the minimum common interference level at node i for resource k. $S_{i,k}$ denotes the signal power received by a radio node i from any existing neighboring radio nodes on resource k.

If per node and per resource measurements are performed, the following applies:

$$C(i) = \mathrm{argmin}_k \left( \sum_{j \in N_k} S_{i,j,k} \right)$$

$S_k^i(j)$ denotes the signal power received by a node j from a neighbor i on resource k. This means that the individually measured signal power values are added together to form the common received power.

Action 204

The radio node 110 broadcasts, to the further radio nodes 120, 130, 140, a beacon signal on the selected at least one resource. In order for other radio nodes to take advantage of the measurements performed by the radio node 110, the beacon signal includes one or more of the values of received power. The values of received power may be provided for either per peer discovery resource or the total received power aggregated over all or a subset of peer discovery resources. Alternatively, the beacon signal includes one or more of the values of the received power levels on peer discovery resources on which the received power level exceeds a predefined threshold.

Expressed differently, the radio nodes of the ad-hoc network may include a summary of their current (local) measurements, such as in the form of the above mentioned values of received power, in their respective beacon signals. Such a summary may comprise the lowest and highest experienced (filtered) interference level and the associated resources. This may aid the radio node performing its listening phase to build reference values that it can, in turn, use as input to its own decision making as to which resource it should select. For example, a node may aggregate different information about lowest and highest interference experienced by each neighboring node to eliminate the most used resources from the amount of resources. Similarly, a given number of resources, e.g. PDRs, providing the least, or almost least, interference by all the neighboring nodes may be given higher priority during the resource selection.

In some embodiments, the radio node 110 may be authorized to include, into the beacon signal, an indication of forbidden resources. The indication indicates to newly arriving nodes, i.e. radio nodes that would potentially join the ad-hoc network 100, which resources they are not allowed to select. That is, the forbidden resources must be explicitly excluded from the amount of resources among which the radio node 110 may select a resource for beacons signaling.

For example, a high rank officer or officer in charge in a disaster recovery situation may want to reserve certain resources, for example as indicated by the indication of forbidden resources, for low latency and high reliability discovery of a small set of other nodes.

Action 205

The radio node 110 may periodically measure, on the amount of resources, received power to obtain values of received power. The values of received power include a respective value of received power for each resource of the amount of resources. The received power includes power of any existing beacons at the amount of resources, which beacons are transmitted by any one or more of the further radio nodes 120, 130, 140.

This means that the radio node 110, after joining the ad-hoc radio communication network 100, may continue to perform per-resource measurements, such as in the form of the above discussed listening phase. The radio node 110, however, may apply another periodicity to perform its listening phase when the radio node 110 is in fact comprised in the ad-hoc radio communication network 100. The radio node 110 may set its periodicity for performing action 205 depending on, or based on one or more of:

its capabilities,
whether it is involved in a communication session,
the interference level it is currently experiencing on the particular resource it is using for periodic beacon signaling,
user configurations, or
when under cellular network coverage, upon instruction by the network, such as the radio network node.

Action 206

When the respective value of received power for the selected at least one resource is above a threshold value for triggering of re-selection, the radio node 110 may re-select at least one other resource of the amount of resources. The respective value of received power for the re-selected at least one other resource is among the least of the obtained respective values of received power. That is to say, the same or similar selection criteria as in action 203 may be applied. In some examples, the threshold value for triggering of re-selection may be equal to the threshold value indicating acceptable received power, possibly including a margin to avoid so called ping-ponging in which reselection would occur repeatedly.

Figure 3:
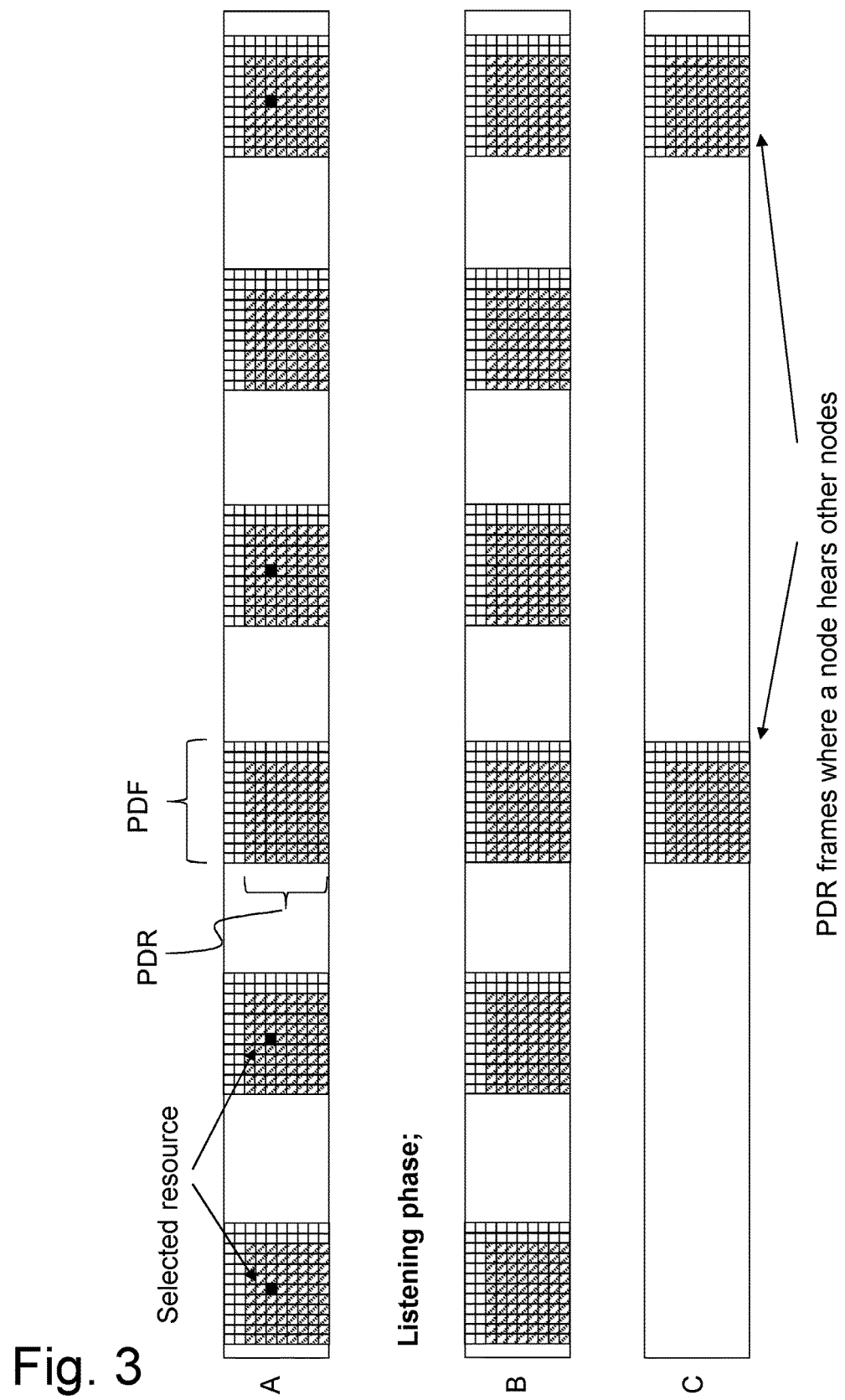
FIG. 3 is an illustration of timing and resource selection.

FIG. 3 shows Peer Discover Frames (PDF) and Peer Discovery Resources (PDR). PDFs are typically used with a low duty cycle out of all available radio frames, such as OFDM frames or LTE frames of 10 ms. In the example of FIG. 3, there is only two PDFs out of 100 (not shown) radio frames during a 1 s time interval, i.e. 100×10 ms. Within each PDF, a subset of the available OFDM PHY resource blocks (PRBs) is used for peer discovery (beacon signaling) purposes (small black square). In this example, it is assumed that the radio node 110 would transmit a beacon signal for the duration of 1 ms. Notably, FIG. 3 is schematic, number of rows and columns in the frames are merely illustrative, not actual.

Autonomous Peer Discovery

When joining a network (or moving to a new position), such as the ad-hoc communication network 100, a device, such as the radio node 110, may wish to be discovered by other nodes. Therefore, the device may have to select at least one PDR out of the available resources in a Peer Discovery Frame (PDF) to transmit a beacon. If the node also wishes to discover the surrounding devices, it has to listen in the remaining resources to receive the discovery signals from other devices.

In case the number of further radio nodes, exceeds, or is equal to, the amount of resources in the PDF, the radio node 110, which is about to join the ad-hoc network, will have to reuse resources used by one or more of the further radio nodes 120, 130, 140. In such a case, if the radio nodes sharing the same resources keep sending on each Peer Discovery Frame (PDF) they will not be able to detect each other since the radio node 110 cannot detect a beacon signal on a PDR while simultaneously transmitting on that PDR. To overcome this problem, the radio node 110 has to select only some of the frames to broadcast beacon signals in. Instead, the radio node 110 will be in a listening mode (not sending beacon signals) during other PDFs. This could be done for example by setting a certain transmission probability Ptr on each PDF.

At the time of each peer discovery frame, the radio node 110 may flip a coin, i.e. randomly select out of 2 possible outcomes: listening or broadcast of beacon signal. Hence, broadcast of the beacon signal in that specific peer discovery frame is allowed with a probability Ptr. If the radio node 110 decides to transmit a beacon in that frame, it autonomously selects one peer discovery resource as described in action 203.

According to embodiments herein, the radio node 110 determines which PDR out of the available ones in the PDF to use when the radio node 110 decides to actually broadcast the beacon signal in action 204 in that particular PDF. Notably, whether or not to actually broadcast the beacon signal may be performed according to the transmission probability mentioned above.

Figure 4:
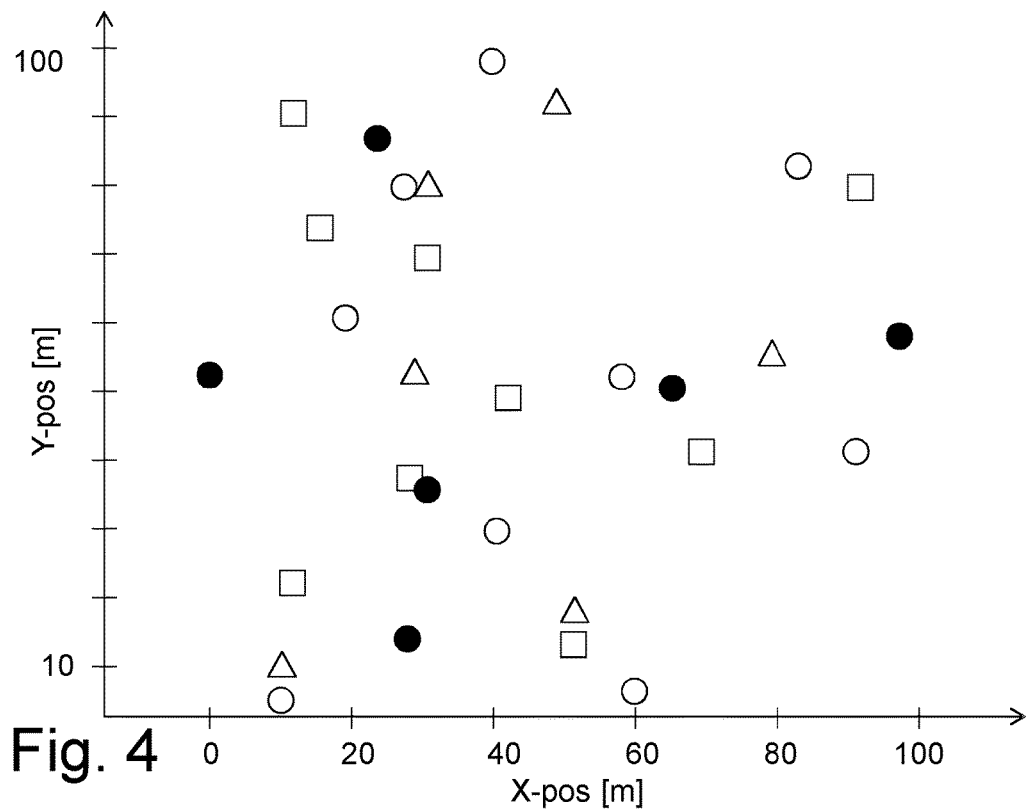
FIGS. 4 and 5 are diagrams illustrating resource selections according to different algorithms.
Figure 5:
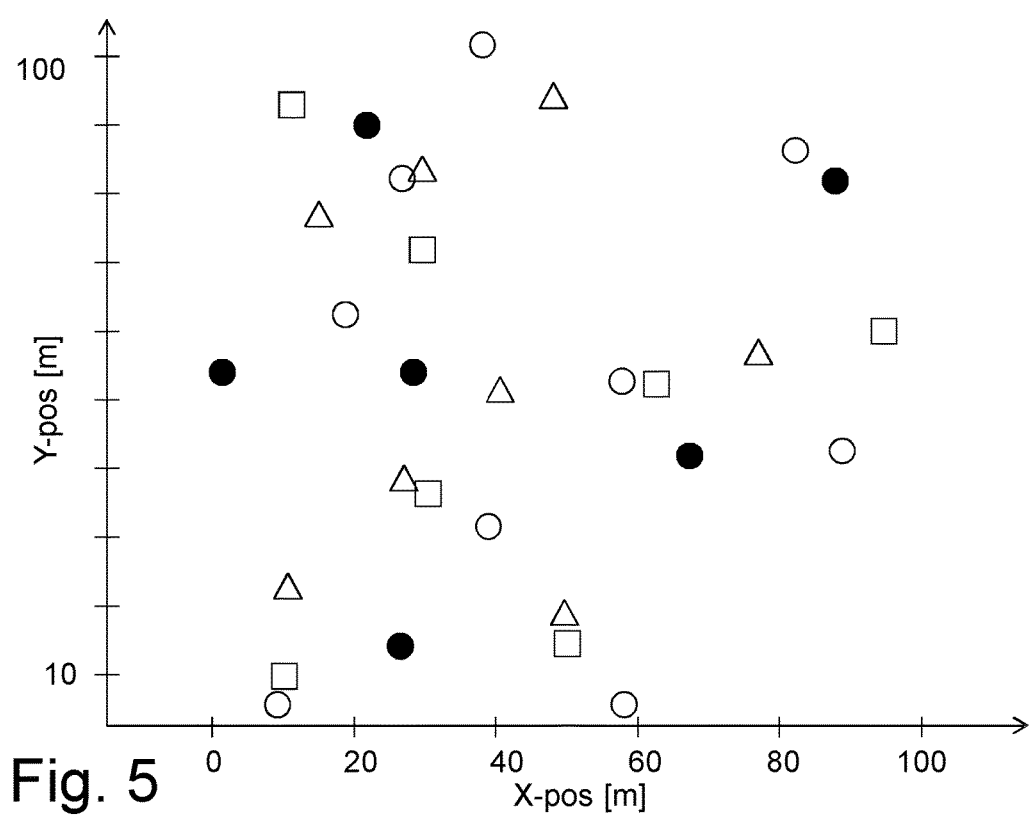

FIGS. 4 and 5 show diagrams illustrating radio nodes and their selected resource for the known greedy algorithm, as mentioned in the background section, and the method according to embodiments herein.

In both diagrams, the selected resource for each radio node is shown as a filled circle, empty circle, a triangle or a square. Hence, in these examples there are four different resources. This means that all of the filled circles, empty circles, triangles and squares show the selected resources for a total of 30 radio nodes. A reason for the difference in selection of resources is that SINR based resource selection takes into account the aggregate interference level on each resource, rather than maximizing the distance to a specific radio node. In other words, the existing scheme does not minimize the interference between nodes of the same resource, i.e. using the same PDR for broadcast of beacon signals. In these examples, it may be observed that the utilization of the peer discovery resources is approximately the same in the prior art scheme as in the scheme proposed herein. However, in according to the scheme proposed herein, i.e. according to the embodiments herein, less complex measurements may be required.

Figure 6:
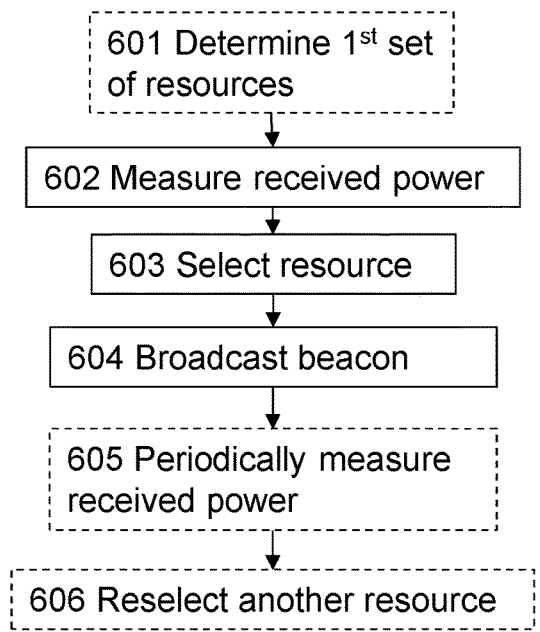
FIG. 6 is a flowchart illustrating embodiments of the method in the radio node.

In FIG. 6, an exemplifying, schematic flowchart of the method in the radio node 110 is shown. As mentioned, the radio node 110 performs a method for managing resources for D2D discovery in an ad-hoc radio communication network 100.

As mentioned, the ad-hoc radio communication network 100 comprises a number of further radio nodes 120, 130, 140. The resources comprise an amount of resources that are dedicated for transmission of beacon signals for D2D discovery.

As mentioned, the amount of resources may be less than or equal to the number of further radio nodes 120, 130, 140.

The following actions may be performed in any suitable order.

Action 601

The radio node 110 may determine the amount of resources as a subset of a default set of resources dedicated for beacon signaling.

The determining 601 may comprise, e.g. randomly, selecting the amount of resources from among the default set of resources.

This action is similar to action 201.

Action 602

The radio node 110 measures, on the amount of resources, received power to obtain values of received power. The values of received power include a respective value of received power for each resource of the amount of resources. The received power includes power of any existing beacon signals received from one or more of the further radio nodes 120, 130, 140.

Preferably, any existing beacon signals are received from two or more of the further radio nodes 120, 130, 140. Hence, the received power is not a measurement of power received per each neighbor, such as per each one of the further radio nodes 120, 130, 140. Expressed differently, a total, or common, received power is measured.

This action is similar to action 202.

Action 603

The radio node 110 selects at least one resource out of the amount of resources. The respective value of received power for the selected at least one resource is among the least of the obtained respective values of received power.

The respective value of received power of the selected at least one resource may be below a threshold value indicating acceptable received power.

This action is similar to action 203.

Action 604

The radio node 110 broadcasts, to the further radio nodes 120, 130, 140, a beacon signal on the selected at least one resource, wherein the beacon signal includes one or more of the values of received power. This action is similar to action 204.

Action 605

The radio node 110 may periodically measure, on the amount of resources, received power to obtain values of received power. The values of received power include a respective value of received power for each resource of the amount of resources. The received power includes power of any existing beacons at the amount of resources, which beacons are transmitted by any one or more of the further radio nodes 120, 130, 140. This action is similar to action 205.

Action 606

When the respective value of received power for the selected at least one resource is above a threshold value for triggering of re-selection, the radio node 110 may re-select at least one other resource of the amount of resources, wherein the respective value of received power for the re-selected at least one other resource is among the least of the obtained respective values of received power. This action is similar to action 206.

Figure 7:
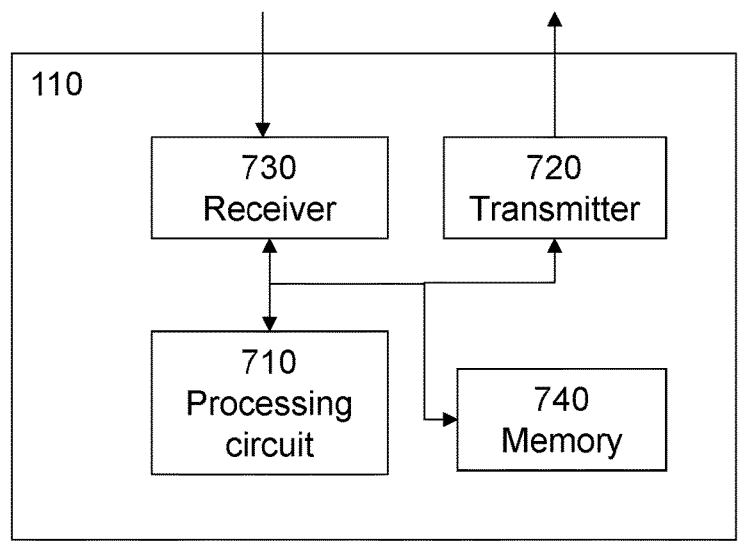
FIG. 7 is a block diagram illustrating embodiments of the radio network node.

With reference to FIG. 7, a schematic block diagram illustrating an exemplifying radio node 110 is shown. The radio node 110 is configured to perform the methods in FIGS. 2 and/or 6. Thus, the radio node 110 is configured to manage resources for D2D discovery in an ad-hoc radio communication network 100, As mentioned, the ad-hoc radio communication network 100 comprises a number of further radio nodes 120, 130, 140. The resources comprise an amount of resources that are dedicated for transmission of beacon signals for D2D discovery.

As mentioned, the amount of resources may be less than or equal to the number of further radio nodes 120, 130, 140.

The radio node 110 comprises a processing circuit 710 configured to measure, on the amount of resources, received power to obtain values of received power. The values of received power include a respective value of received power for each resource of the amount of resources. The received power includes power of any existing beacon signals received from one or more of the further radio nodes 120, 130, 140.

Furthermore, the processing circuit 710 is configured to select at least one resource out of the amount of resources. The respective value of received power for the selected at least one resource is among the least of the obtained respective values of received power. The respective value of received power of the selected at least one resource may be below a threshold value indicating acceptable received power.

Moreover, the processing circuit 710 is configured to broadcast, to the further radio nodes 120, 130, 140, a beacon signal on the selected at least one resource. The beacon signal includes one or more of the values of received power.

In some embodiments, the processing circuit 710 may further be configured to determine the amount of resources as a subset of a default set of resources dedicated for beacon signaling.

The processing circuit 710 may further be configured randomly select the amount of resources from among the default set of resources.

The processing circuit 710 may further be configured to select the amount of resources from among the default set of resources. The obtained received power value for each resource of the amount of resources is below a threshold value for selection of the amount of resources.

In some embodiments, the processing circuit 710 may further be configured to periodically measure, on the amount of resources, received power to obtain values of received power. The values of received power may include a respective value of received power for each resource of the amount of resources. The received power may include power of any existing beacons at the amount of resources, which beacons are transmitted by any one or more of the further radio nodes 120, 130, 140.

In these embodiments, the processing circuit 710 may further be configured to re-select at least one other resource of the amount of resources when the respective value of received power for the selected at least one resource is above a threshold value for triggering of re-selection. The respective value of received power for the re-selected at least one other resource may be among the least of the obtained respective values of received power.

The processing circuit 710 may be a processing unit, a processor, an application specific integrated circuit (ASIC), a field-programmable gate array (FPGA) or the like. As an example, a processor, an ASIC, an FPGA or the like may comprise one or more processor kernels.

The network node 110 further comprises a transmitter 720, which may be configured to send one or more of the beacon signal, other numbers, values and parameters described herein.

The network node 110 further comprises a receiver 730, which may be configured to receive one or more of any existing beacon signals from the further radio nodes.

The network node 110 further comprises a memory 740 for storing software to be executed by, for example, the processing circuit. The software may comprise instructions to enable the processing circuit to perform the method in the radio node 110 as described above in conjunction with FIGS. 2 and/or 6. The memory may be a hard disk, a magnetic storage medium, a portable computer diskette or disc, flash memory, random access memory (RAM) or the like. Furthermore, the memory may be an internal register memory of a processor.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, in a radio node, for managing resources for Device-to-Device (D2D) discovery in an ad-hoc radio communication network, wherein the ad-hoc radio communication network comprises a number of further radio nodes, wherein the resources comprise an amount of resources that are dedicated for transmission of beacon signals for D2D discovery, the method comprising:
   determining the amount of resources as a subset of a default set of resources dedicated for beacon signaling;
   measuring, on the amount of resources, received power to obtain values of received power, wherein the values of received power include a respective value of received power for each resource of the amount of resources, wherein the received power includes power of any existing beacon signals received from one or more of the further radio nodes;
   selecting at least one resource out of the amount of resources, wherein the respective value of received power for the selected at least one resource is among a least of the obtained respective values of received power; and
   broadcasting, to the further radio nodes, a beacon signal on the selected at least one resource, wherein the beacon signal includes one or more of the values of received power.

2. The method of claim 1, wherein the determining comprises randomly selecting the amount of resources from among the default set of resources.

3. The method of claim 1, further comprising:
   periodically measuring received power, on the amount of resources, to obtain values of received power, wherein the values of received power include a respective value of received power for each resource of the amount of resources, wherein the received power includes power of any existing beacons, on the amount of resources, transmitted by any one or more of the further radio nodes; and
   in response to the respective value of received power for the selected at least one resource being above a threshold value for triggering of re-selection, re-selecting at least one other resource of the amount of resources, wherein the respective value of received power for the re-selected at least one other resource is among the least of the obtained respective values of received power.

4. The method of claim 1, wherein the respective value of received power of the selected at least one resource is below a threshold value for received power.

5. The method of claim 1, wherein the amount of resources is less than or equal to the number of further radio nodes.

6. A radio node configured to manage resources for Device-to-Device (D2D) discovery in an ad-hoc radio communication network, wherein the ad-hoc radio communication network comprises a number of further radio nodes, wherein the resources comprise an amount of resources that are dedicated for transmission of beacon signals for D2D discovery, the radio node comprising:
   a processing circuit configured to:
      determine the amount of resources as a subset of a default set of resources dedicated for beacon signaling;
      measure, on the amount of resources, received power to obtain values of received power, wherein the values of received power include a respective value of received power for each resource of the amount of resources, wherein the received power includes power of any existing beacon signals received from one or more of the further radio nodes;
      select at least one resource out of the amount of resources, wherein the respective value of received power for the selected at least one resource is among a least of the obtained respective values of received power; and
      broadcast, to the further radio nodes, a beacon signal on the selected at least one resource, wherein the beacon signal includes one or more of the values of received power.

7. The radio node of claim 6, wherein the processing circuit is configured to randomly select the amount of resources from among the default set of resources.

8. The radio node of claim 6, wherein the processing circuit is further configured to:
   periodically measure, on the amount of resources, received power to obtain values of received power;
      wherein the values of received power include a respective value of received power for each resource of the amount of resources; and
      wherein the received power includes power of any existing beacons, on the amount of resources, transmitted by any one or more of the further radio nodes; and
   re-select at least one other resource of the amount of resources in response to the respective value for the selected at least one resource being above a threshold value for triggering of re-selection, wherein the respective value of received power for the re-selected at least one other resource is among the least of the obtained respective values of received power.

9. The radio node of claim 6, wherein the respective value of received power of the selected at least one resource is below a threshold value for received power.

10. The radio node of claim 6, wherein the amount of resources is less than or equal to the number of further radio nodes.

11. The method of claim 1,
wherein the radio node is a first radio node and the further radio nodes comprise a second radio node and a third radio node that is different than the first radio node; and
wherein the measuring comprises measuring a total received power from beacon signals on a particular resource, the beacon signals comprising a beacon signal received from each of the second radio node and the third radio node.

12. The method of claim 1, wherein the broadcasting comprises informing the further radio nodes of a received signal power at the radio node for the further radio nodes to respectively select a default resource for sending a beacon for D2D discovery signaling.

13. The method of claim 12, wherein the beacon further comprises a summary of a lowest and highest received power value, for a given one of the further radio nodes to aggregate summary information for selecting a default resource for sending beacons.

14. The method of claim 12, wherein the beacon further comprises an indication of restricted resources, for preventing selection of the resource as a default resource for sending beacons by a further radio node.

15. The method of claim 1, wherein when a received power value in the beacon signal is above a threshold, the beacon signal indicates that a resource is occupied and cannot be used for sending beacons by the further radio nodes.

* * * * *